US 11,875,546 B2

United States Patent
Zhou et al.

(10) Patent No.: US 11,875,546 B2
(45) Date of Patent: Jan. 16, 2024

(54) VISUAL PERCEPTION METHOD AND APPARATUS, PERCEPTION NETWORK TRAINING METHOD AND APPARATUS, DEVICE AND STORAGE MEDIUM

(71) Applicant: BEIHANG UNIVERSITY, Beijing (CN)

(72) Inventors: Bin Zhou, Beijing (CN); Zongdai Liu, Beijing (CN); Qinping Zhao, Beijing (CN); Hongyu Wu, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 492 days.

(21) Appl. No.: 17/199,338

(22) Filed: Mar. 11, 2021

(65) Prior Publication Data

US 2021/0387646 A1 Dec. 16, 2021

(30) Foreign Application Priority Data

Jun. 11, 2020 (CN) .......................... 202010530027.7

(51) Int. Cl.
*G06V 10/22* (2022.01)
*G06T 7/73* (2017.01)
(Continued)

(52) U.S. Cl.
CPC ............. *G06V 10/22* (2022.01); *B60W 30/09* (2013.01); *G06F 18/214* (2023.01);
(Continued)

(58) Field of Classification Search
CPC ........ G06V 20/52; G06V 20/41; G06F 18/23; G06T 7/246; G06N 3/02; A61B 5/11
See application file for complete search history.

(56) References Cited

U.S. PATENT DOCUMENTS 8,620,026 B2 * 12/2013 Datta ..................... G06V 20/47
382/103
8,983,133 B2 * 3/2015 Feris ..................... G06V 20/52
382/103
(Continued)

FOREIGN PATENT DOCUMENTS

CN 109886100 A 6/2019
CN 109949402 A 6/2019
(Continued)

OTHER PUBLICATIONS

The first OA of CN application No. 202010530027.7.

*Primary Examiner* — Yosef Kassa
(74) *Attorney, Agent, or Firm* — J.C. PATENTS

(57) ABSTRACT

The present disclosure provides a visual perception method and apparatus, a perception network training method and apparatus, a device and a storage medium. The visual perception method recognizes the acquired image to be perceived with a perception network to determine a perceived target and a pose of the perceived target, and finally determines a control command according to a preset control algorithm and the pose, so as to enable an object to be controlled to determine a processing strategy for the perceived target according to the control command. According to the perception network training method, acquire image data and model data, then generate an edited image with a preset editing algorithm according to a 2D image and a 3D model, and finally train the perception network to be trained according to the edited image and the label.

20 Claims, 10 Drawing Sheets

(51) Int. Cl.
  *B60W 30/09*   (2012.01)
  *G06T 19/00*   (2011.01)
  *G06V 20/56*   (2022.01)
  *G06V 20/64*   (2022.01)
  *G06F 18/214*   (2023.01)
  *G06F 18/2134*   (2023.01)
  *G06V 10/44*   (2022.01)

(52) U.S. Cl.
  CPC .......... *G06F 18/21343* (2023.01); *G06T 7/73* (2017.01); *G06T 19/006* (2013.01); *G06V 10/454* (2022.01); *G06V 20/56* (2022.01); *G06V 20/653* (2022.01); *B60W 2420/42* (2013.01); *G06T 2207/20084* (2013.01); *G06T 2207/30261* (2013.01); *G06T 2219/2004* (2013.01)

(56) References Cited

U.S. PATENT DOCUMENTS

| | | | | |
|---|---|---|---|---|
| 10,146,318 | B2 * | 12/2018 | Malzbender | G06V 40/28 |
| 10,507,837 | B2 * | 12/2019 | Ishida | B60W 20/00 |
| 10,789,717 | B2 * | 9/2020 | Kim | G06V 10/776 |
| 10,911,775 | B1 * | 2/2021 | Zhu | H04N 19/46 |
| 10,977,520 | B2 * | 4/2021 | Turkelson | G06V 10/82 |

FOREIGN PATENT DOCUMENTS

| | | |
|---|---|---|
| CN | 110175595 A | 8/2019 |
| CN | 110366107 A | 10/2019 |
| CN | 111178253 A | 5/2020 |
| WO | WO2002020287 | 3/2002 |

* cited by examiner

VISUAL PERCEPTION METHOD AND APPARATUS, PERCEPTION NETWORK TRAINING METHOD AND APPARATUS, DEVICE AND STORAGE MEDIUM

CROSS-REFERENCE TO RELATED APPLICATION

This application claims priority to Chinese Patent Application No. 202010530027.7, filed on Jun. 11, 2020, which is hereby incorporated by reference in its entirety.

TECHNICAL FIELD

The present disclosure relates to the field of object detection and, in particular, relates to a visual perception method and apparatus, a perception network training method and apparatus, a device and a storage medium.

BACKGROUND

The object detection is a basic issue in the field of computer vision. In uncontrolled natural scenes, locating and identifying a specific object quickly and accurately is an important basic function for many artificial intelligence application scenarios. Visual perception is an application of object detection.

The existing visual perception technology generally includes detecting an image through a deep neural network-based visual perception system to perform instance segmentation, i.e., to obtain only the perceived target, and conducting the pose estimation of the whole perceived target. In the art, the above situation is referred to as: bounding box and contour-based shallow understanding of objects.

However, in actual application scenarios, perceiving the target as a whole is still not enough for artificial intelligence to adopt sufficient coping strategies. For example: in an autonomous driving scenario, when a vehicle is parked on the roadside and the door is opened, someone may get off the vehicle. However, because the vehicle, as a whole, is only perceived to be parked on the roadside, the automatic driving vehicle cannot make a response to avoid collision with the person getting off the vehicle. That is to say, the perception granularity in the prior art is too coarse, resulting in the problem of being impossible to analyze and understand the local motion of the object.

SUMMARY

The present disclosure provides a visual perception method and apparatus, a perception network training method and apparatus, a device and a storage medium, so as to solve the problem of being impossible to analyze and understand the local motion of the object because of too coarse perception granularity in the prior art.

In a first aspect, the present disclosure provides a visual perception method, including:
acquiring an image to be perceived, where the image to be perceived includes at least one target object;
recognizing the image to be perceived with a perception network to determine the perceived target and a pose of the perceived target, where the perceived target is a target object of which the pose conforms to a preset attribute;
determining a control command according to a preset control algorithm and the pose, so as to enable an object to be controlled to determine a processing strategy for the perceived target according to the control command.

Alternatively, the recognizing the image to be perceived with a perception network to determine the perceived target and a pose of the perceived target, includes:
performing feature extraction on the image to be perceived to determine features of the image to be perceived;
classifying the features with a classifier to determine the perceived target; and
determining the pose of the perceived target with a recurrent sub-network.

In one possible design, the determining the pose of perceived target with a recurrent sub-network, includes:
determining a moving component in a preset database that matches the perceived target;
determining, with the recurrent sub-network, status probability of the moving component according to the moving component and a standard status of the moving component;
determining the pose of the perceived target according to the status probability, where the pose includes a status vector.

Alternatively, the perceived target comprises a vehicle.

In one possible design, the determining a control command according to a preset control algorithm and the pose, includes:
determining the control command according to a preset automatic driving control algorithm and the pose, so as to enable the vehicle to be controlled to decelerate or avoid the perceived target according to the control command.

Alternatively, after the recognizing the image to be perceived with a perception network to determine a perceived target and a pose of the perceived target, the method further includes:
labeling the perceived target and the pose on the image to be perceived, and displaying the labeled perceived image.

In one possible design, the moving component includes: at least one of a front-left door, a rear-left door, a front-right door, a rear-right door, a trunk cover and a bonnet.

In a second aspect, the present disclosure provides a perception network training method, including:
acquiring image data and model data containing the perceived target, where the image data comprises a 2D image and a label, and the model data comprises a 3D model;
generating, with a preset editing algorithm, an edited image according to the 2D image and the 3D model;
training the perception network to be trained according to the edited image and the label to determine the perception network.

In one possible design, the generating, with a preset editing algorithm, an edited image according to the 2D image and the 3D model, includes:
determining a corresponding moving component of the perceived target;
extracting a first visible area of the moving component in the 2D image;
generating the edited image according to the first visible area and the 3D model.

Alternatively, the generating the edited image according to the first visible area and the 3D model, includes:
determining pose information of the moving component according to the moving component, where the pose information is a matrix formed by a motion state of the moving component in 6-degrees of freedom;

generating, with a projection model, a 3D point cloud of the first visible area according to the first visible area and the pose information;

determining a second visible area according to the 3D point cloud and the pose information, where the second visible area is a visible area of the moving component at a post-movement position;

generating, with a filling algorithm, the edited image according to the second visible area and the 3D model.

Further alternatively, the generating, with a filling algorithm, the edited image according to the second visible area and the 3D model, includes:

aligning the second visible area with the 3D model to determine an invisible area;

determining, with the rendering technology, a filling image of the invisible area according to the 3D model;

superimposing the filling image with the second visible area and replacing the moving component of the 2D image with the superimposed image to generate the edited image.

In one possible design, after the determining a second visible area, the method further includes:

performing, with a smoothing algorithm, smoothing processing on the second visible area.

In one possible design, the training the perception network to be trained according to the edited image and the label to determine the perception network, includes:

extracting, with a main backbone network and an auxiliary backbone network respectively, features of the edited image to determine a main feature and an auxiliary feature;

combining the main feature and the auxiliary feature to acquire a correlated feature;

determining a status vector of the moving component according to the correlated feature and a recurrent sub-network;

training the perception network to be trained according to the status vector and the label to determine the perception network.

Alternatively, the training the perception network to be trained according to the status vector and the label to determine the perception network, includes:

calculating a cross-entropy loss function according to the status vector and the label;

training, with the cross-entropy loss function, the perception network to be trained to determine the perception network.

In one possible design, the main backbone network is configured with a first weight, and the auxiliary backbone network is configured with a second weight, and before the combining the main feature and the auxiliary feature to acquire a correlated feature, the method further includes:

pre-training the main backbone network and the auxiliary backbone network to determine the first weight and the second weight.

Alternatively, the pre-training includes:
acquiring an actual testing image and a general detecting image;
conducting perception training on the main backbone network with the actual testing image;
conducting perception training on the auxiliary backbone network with the general detecting image.

Alternatively, the main backbone network and the auxiliary backbone network are the same target detection network.

In a third aspect, the present disclosure provides a visual perception apparatus, including:

an acquisition module, configured to acquire an image to be perceived, where the image to be perceived contains at least one target object;

a processing module, configured to recognize the image to be perceived with a perception network, to determine the perceived target and the pose of the perceived target, where the perceived target is a target object of which the pose conforms to a preset attribute;

a control module, configured to determine a control command according to a preset control algorithm and the pose, so as to enable an object to be controlled to determine a processing strategy for the perceived target according to the control command.

Alternatively, the processing module is configured to perform feature extraction on the image to be perceived to determine features of the image to be perceived; classify the features with a classifier to determine the perceived target; and determine the pose of the perceived target with a recurrent sub-network.

In one possible design, the processing module is also configured to determine a moving component in a preset database that matches the perceived target; determine, with the recurrent sub-network, status probability of the moving component according to the moving component and a standard status of the moving component; and determine the pose of the perceived target according to the status probability, where the pose includes a status vector.

In one possible design, the control module is configured to determine the control command according to a preset automatic driving control algorithm and the pose, so as to enable the vehicle to be controlled to decelerate or avoid the perceived target according to the control command.

Alternatively, the processing module is also configured to label the perceived target and the pose on the image to be perceived and display the labeled perceived image, after recognizing the image to be perceived with a perception network to determine the perceived target and the pose of the perceived target.

In a fourth aspect, the present disclosure provides a perception network training apparatus, including:

an acquisition module, configured to acquire image data and model data containing a perceived target, where the image data includes a 2D image and a label, and the model data includes a 3D model;

an image editing module, configured to generate, with a preset editing algorithm, an editing image according to the 2D image and the 3D model; and a training module, configured to train the perception network to be trained according to the editing image and the label to determine the perception network.

In one possible design, the image editing module is configured to determine a corresponding moving component of the perceived target; extract a first visible area of the moving component in the 2D image; and generate the edited image according to the first visible area and the 3D model.

In one possible design, the image editing module is configured to determine pose information of the moving component according to the moving component, where the pose information is a matrix formed by a motion status of the moving component in 6-degrees of freedom; generate, with a projection model, a 3D point cloud of the first visible area according to the first visible area and the pose information; determine a second visible area according to the 3D point cloud and the pose information, where the second visible area is a visible area of the moving component at a post-movement position; and generate, with a filling algorithm, the edited image according to the second visible area and the 3D model.

In one possible design, the image editing module is also configured to align the second visible area with the 3D model to determine an invisible area; determine, with the rendering technology, a filling image of the invisible area according to the 3D model; and superimpose the filling image with the second visible area and replace the moving component of the image with the superimposed image to generate the edited image.

Alternatively, the image editing module is further configured to perform, with a smoothing algorithm, smoothing processing on the second visible area, after determining the second visible area.

Alternatively, the training module is also configured to extract, with a main backbone network and an auxiliary backbone network respectively, features of the edited image to determine a main feature and an auxiliary feature; input the main feature and the auxiliary feature into the main backbone network and the auxiliary backbone network to acquire a correlated feature, where the main backbone network is configured with a first weight, and the auxiliary backbone network is configured with a second weight; determine a status vector of the moving component according to the correlated feature and a recurrent sub-network; and train the perception network to be trained according to the status vector and the label to determine the perception network.

In one possible design, the training module is also configured to calculate a cross-entropy loss function according to the status vector and the label; and train, with the cross-entropy loss function, the perception network to be trained to determine the perception network.

Alternatively, the main backbone network is configured with a first weight, and the auxiliary backbone network is configured with a second weight, and the training module is further configured to pre-train the main backbone network and the auxiliary backbone network to determine the first weight and the second weight, before inputting the main feature and the auxiliary feature into the main backbone network and the auxiliary backbone network to acquire the correlated feature.

Alternatively, the acquisition module is also configured to acquire an actual testing image and a general detecting image; and the training module is also configured to conduct perception training on the main backbone network with the actual testing image; and conduct perception training on the auxiliary backbone network with the general detecting image.

In a fifth aspect, the present disclosure provides an electronic device for visual perception, includes:

a memory, configured to store program instructions; and
a processor, configured to call and execute the program instructions in the memory to implement any one of the possible visual perception methods in the first aspect.

In a sixth aspect, the present disclosure provides an electronic device for perception network training, includes:

a memory, configured to store program instructions; and
a processor, configured to call and execute the program instructions in the memory to implement any one of the possible visual perception methods in the second aspect.

In a seventh aspect, the present disclosure provides a readable storage medium storing a computer program, where the computer program is configured to implement any one of the possible visual perception methods in the first aspect.

In an eighth aspect, the present disclosure provides a readable storage medium storing a computer program, where the computer program is configured to implement any one of the possible perception network training methods in the second aspect.

The present disclosure provides a visual perception method and apparatus, a perception network training method and apparatus, a device and a storage medium. The visual perception method recognizes the acquired image to be perceived with a perception network to determine a perceived target and a pose of the perceived target, and finally determines a control command according to a preset control algorithm and the pose, so as to enable an object to be controlled to determine a processing strategy for the perceived target according to the control command, thus realizing the pose perception of the moving component of the perceived target, and further achieving the technical effects of refining the perception granularity and deepening the analysis and understanding of the local motion of the object. The perception network training method acquires image data and model data, then generates an edited image with a preset editing algorithm according to a 2D image and a 3D model, and finally trains the perception network to be trained according to the edited image and the label, thus realizing the technical effect of generating a real training image with less domain difference more quickly.

BRIEF DESCRIPTION OF DRAWINGS

In order to illustrate technical solutions in the present disclosure or in the prior art more explicitly, the following will briefly introduce the drawings required in the description of embodiments or the prior art. Obviously, the drawings in the following description are some embodiments of the present disclosure. For those of ordinary skill in the art, other drawings can obtain based on these drawings without creative labor.

DESCRIPTION OF EMBODIMENTS

Figure 1:
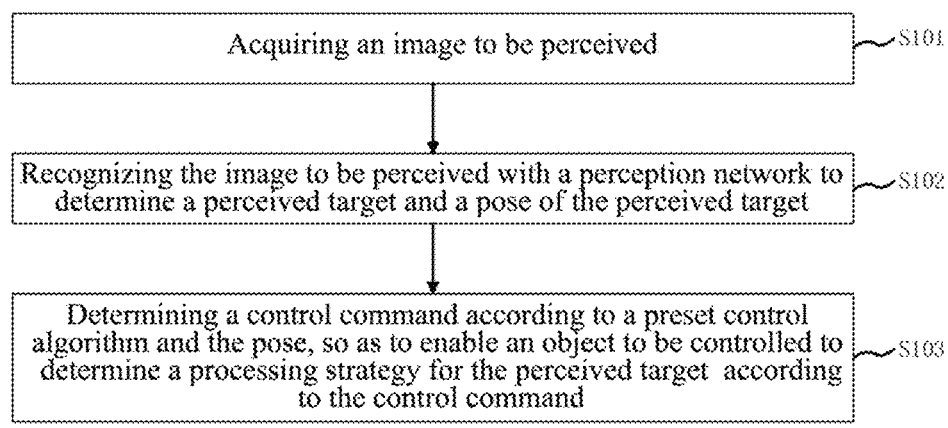
FIG. 1 is a schematic flow chart of a visual perception method according to the present disclosure.

In order to make the objective, technical solutions and advantages of the embodiments of the present disclosure more explicit, the technical solutions in the embodiments of the present disclosure are illustrated clearly and completely in combination with the accompanying drawings in the embodiments of the present disclosure hereinafter. Obviously, the described embodiments are only a part of the embodiments of the present disclosure, and are not all of the embodiments thereof. Based on the embodiments of the present disclosure, all the other embodiments obtained by those of ordinary skill in the art without creative labor, including but not limited to combinations of multiple embodiments, are within the protection scope of the present disclosure.

The terms "first", "second", "third", "fourth", etc., (if any) in the description, claims and the above-mentioned drawings are only used to distinguish similar objects, which are not necessary for describing the special sequence or precedence order. It should be understood that the data thus used under appropriate conditions may be interchanged, such that the embodiments of the present disclosure described herein can be implemented, for example, in a sequence other than those illustrated and described herein. Additionally, the terms "include", "have" and any of their variants are meant to cover the non-exclusive inclusion. For example, a process, method, system, product or device included a series of steps or units shall not only be limited to the steps or units listed explicitly, but may include other steps or units not explicitly listed or inherent to those processes, methods, products or devices.

The existing visual perception technology generally includes detecting an image through deep neural network-based visual perception system to perform a whole instance segmentation, i.e., to obtain only the whole perceived target, and conducting the pose estimation of the whole perceived target. In the art, the above situation is referred to as: bounding box and contour-based shallow understanding of objects.

However, in actual application scenarios, perceiving the target as a whole is still not enough to provide enough information for artificial intelligence to adopt sufficient coping strategies. For example: in an autonomous driving scenario, when a vehicle is parked on the roadside and the door is opened, someone may get off the vehicle, but it is only perceived that the vehicle, as a whole, is parking on the roadside, and the automatic driving vehicle cannot make a response to avoid collision with the person getting off the vehicle. That is to say, the perception granularity in the prior art is too coarse, resulting in the problem of being impossible to analyze and understand the local motion of the object.

To solve the above problem, the inventive concept of the present disclosure is to use a perception model with finer granularity to perceive and recognize the target. However, it rises with a new problem about how to classify the granularity effectively, since a coarse granularity may be not conducive to the full analysis and understanding of the perceptual target, and a fine granularity may lead to a perception process which is more complicated, time-consuming and with more cost. Thus, the first problem faced by the inventor of the present disclosure is how to select the granularity properly. In practice, the inventor of the present disclosure has made a lot of creative labor for a long time and found that it is a more appropriate granularity to divide the movable part of the perceived target into the component level. For example, taking a person's hands and feet as the granularity is more appropriate compared with taking a person as a whole, but the granularity would be too fine upon taking fingers as the granularity. For another example, it is appropriate to divide a vehicle in the granularity of component level, such as a door or a trunk cover, but the granularity would be too fine in case the vehicle is divided in a level of a door hinge, and a trunk support rod.

After solving the problem of determining the granularity for dividing, the next problem lies in how to acquire the proper perception network applicable to perceiving the moving component. For this reason, the inventor of the present disclosure has done many experiments and creatively refined to get a neural network-based perception network. With the perception network training method according to the present disclosure, the perception network supporting the perception on the component level is obtained through training.

The present disclosure provides a visual perception method and apparatus, a perception network training method and apparatus, a device and a storage medium as specifically described in the following embodiments.

In order to facilitate the understanding of the overall invention of the present disclosure, the following contents firstly describe how to use a perception network to perceive and recognize a target when there is the perception network capable of sensing on the level of moving components, so as to solve the problem of failing to provide enough strategy information to the control system caused by the improper analyzing or understanding on the perceived target due to the coarse perception granularity. Then, it introduces how to acquire the perception network through target training, and creatively proposes a method for accelerating the generation of training images and obtaining training images with smaller domain differences and closer to the actual situation.

FIG. 1 is a schematic flow chart of a visual perception method according to the present disclosure. As shown in FIG. 1, the specific steps of the method, include:

S101, acquiring an image to be perceived.

In this step, the image containing an object to be perceived, for example, an image captured by a camera, or an image intercepted from a surveillance video, is received/acquired from an external database or an external input interface.

S102, recognizing the image to be perceived with a perception network to determine a perceived target and a pose of the perceived target.

In this step, firstly, features of the image to be perceived are extracted with the perception network based on an algorithm of a neural network. Then, the acquired features are classified and recognized. With the perception granularity of the perception network in this embodiment, the moving component of the perceived target can be recognized. Therefore, through the feature extraction performed on the image to be perceived, the perception network firstly determines the entirety of the perceived target, and then recognizes the status of the moving components in the entire perceived target. For example, the perception network firstly perceives the whole of a person in an image, and then divides the whole of a person to obtain the moving components, such as the hands of a person, and then recognizes the movement status of the hands. The movement status of the human hand may be defined as three poses, such as uplift, horizontal lift and down lift, and then the perception network can give a definite status label through recognizing the human hand, that is, the pose of the perceived target. It should also be noted that this pose is a trigger flag corresponding to a preset attribute defined for the perceiving target in the perception network. For example, the human hand is lifted horizontally, and the preset attribute defined in the perception network is that the perceived target gives an interception instruction.

S103, determining a control command according to a preset control algorithm and the pose, so as to enable an object to be controlled to determine a processing strategy for the perceived target according to the control command.

The object to be controlled is a carrier containing the visual perception method of the embodiment. To facilitate the illustration of this step, a specific example is described below. The object to be controlled is, for example, an automatic driving vehicle. When the perception network recognizes that the pose of the hand of a pedestrian at the roadside is a horizontal lift, it is confirmed that the perceived target puts forward an interception instruction according to the attribute of the horizontal lift. At this time, the preset control algorithm generates the control command of braking the vehicle down, thus making the vehicle brake and stop automatically.

It should be noted that this embodiment is not limited to the above example of vehicle braking. Those skilled in the art can apply it to specific scenarios according to the meaning of this step, and this embodiment does not limit the application scenarios.

The embodiment provides a visual perception method to recognize the acquired image to be perceived with the perception network to determine the perceived target and the pose of the perceived target, and finally determines the control command according to the preset control algorithm and the pose, so as to enable the object to be controlled to determine the processing strategy for the perceived target according to the control command, thus realizing the pose perception of the moving components of the perceived target, and further achieving the technical effect of refining the perception granularity and deepening the analysis and understanding of the local motion of the object.

Figure 2:
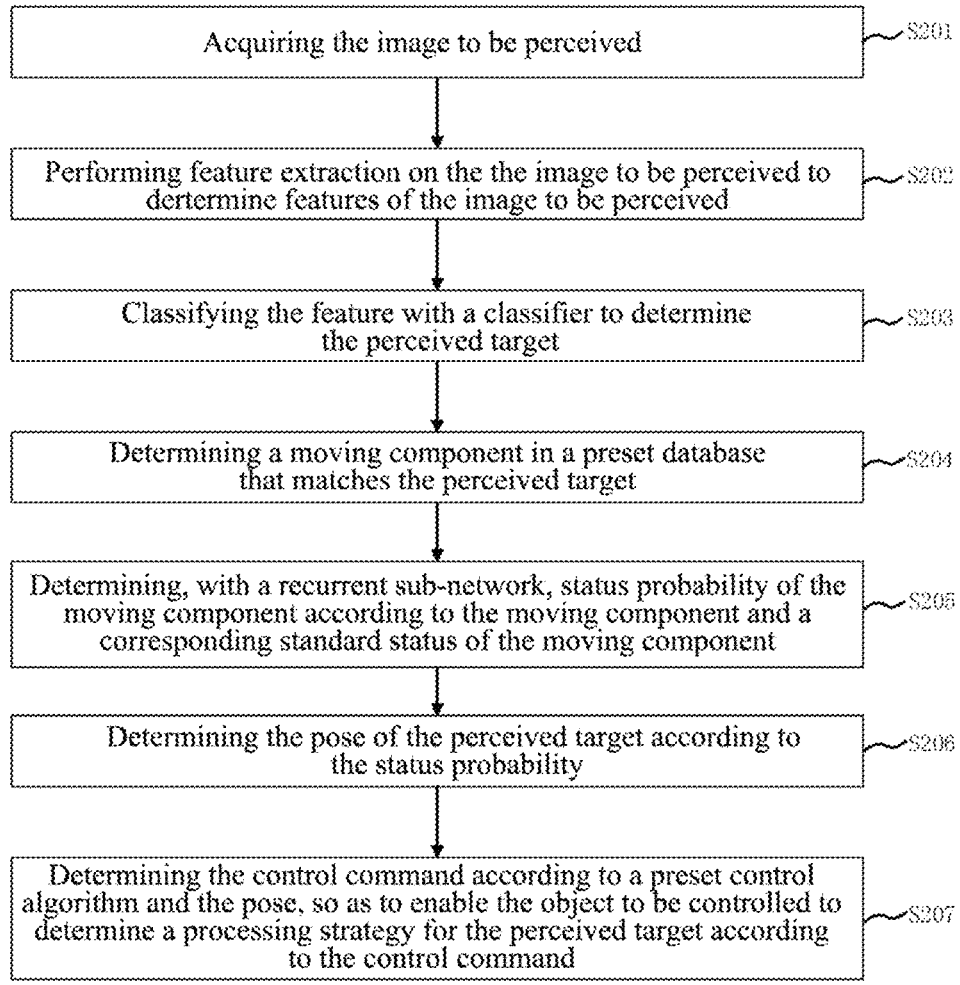
FIG. 2 is a schematic flow chart of another visual perception method according to the present disclosure.

FIG. 2 is a schematic flow chart of another visual perception method according to the present disclosure. As shown in FIG. 2, the specific steps of the method include:

S201, acquiring the image to be perceived.

It should be noted that, in order to facilitate those skilled in the art to understand the specific implementation of the visual perception method of the present disclosure, the application scenario of this embodiment is that the intelligent driving vehicle that contains the visual perception method of this embodiment perceives and recognizes other vehicles encountered on the road while driving. Those skilled in the art can select specific application scenarios with reference to the implementation of the visual perception method in this embodiment, and the application scenarios are not limited to the application scenarios described in this embodiment.

In this step, an image of the current real road condition captured by a front camera of the intelligent driving vehicle is the image to be perceived.

Figure 3A:
FIGS. 3*a*-3*f* are schematic diagrams of application scenarios of a visual perception method according to embodiments of the present disclosure.
Figure 3B:
Figure 3C:
Figure 3D:
Figure 3E:

FIGS. 3a-3f are schematic diagrams of a visual perception method according to an embodiment of the present disclosure. As shown in FIGS. 3a, 3c and 3e, the intelligent driving vehicle is driving on the city road with the front camera capturing images of the real-time road conditions.

S202, performing feature extraction on the image to be perceived to determine features of the image to be perceived.

In this step, the neural network-based perception network extracts the features of the captured images of road conditions. Specifically, the images are convoluted through multiple convolution layers to acquire the feature image or the feature vector.

S203, classifying the features with a classifier to determine the perceived target.

In this step, the features of the image are classified by the classifier (i.e., the classification standard is whether to conform to the feature attribute of the vehicle), so as to determine the vehicle in the image to be perceived, i.e., the road condition image. As shown in FIG. 3b, there may be multiple perceived targets in the image to be perceived, and thus the classifier shall classify and distinguish the objects in the image to find out all the perceived targets conforming to the features of the vehicle.

S204, determining a moving component in a preset database that matches the perceived target.

In this step, the classifications of moving components corresponding to different perceived targets are stored in a preset database. The preset classification would be helpful to analyze and understand the perceived targets with enough fine granularity. As the classification granularity is varied for various perceived targets, it is necessary to preset the corresponding moving components of the perceived targets and store them in the database, or in a memory cell with the same function of the database, or combine the classifications with the perceived targets directly to store as an integral data. In this embodiment, as for the perceiving target vehicle, the moving components of the vehicle can be divided to include: at least one of a front-left door, a rear-left door, a front-right door, a rear-right door, a trunk cover and a bonnet.

S205, determining, with a recurrent sub-network, status probability of the moving component according to the moving component and a corresponding standard status of the moving component.

In this step, each moving component has its corresponding standard status. For example, the standard status of the vehicle door can be set to be open or closed, the status label is set as 1 when the door is open, and the status label is set as 0 when the door is closed. The recurrent sub-network is used to detect the status of all the corresponding moving components of the perceived target one by one. Specifically, the convolution algorithm is applied to perform deep convolution with the features, and then the normalization process is applied, so as to obtain the status probability of within the value range of [0, 1].

S206, determining the pose of the perceived target according to the status probability.

In this step, the perception probability can be compared with the preset status determination threshold. For example, if the status probability of opening the door is greater than or equal to the status determination threshold, the door is judged to be in an open status, and thus the door status in the pose of the vehicle is set to 1. In the same way, the status of other moving components of the vehicle can be judged, and the status of all the moving components can be formed into a multi-dimensional vector. This multi-dimensional status vector is the pose of the perceived target. It can be understood that when there is only one moving component of the perceived target, the pose is a binary status quantity, that is, the value is 0 or 1.

Figure 3F:

Alternatively, as shown in FIGS. 3b, 3d and 3f, after determining the pose of the perceived target, the perceived target and the pose of the perceived target can be labeled on the image to be perceived. The specific implementation may be to label the outer contour of the perceived target with a curved frame, and label the moving component that meets a specific status with different colored curved frames, and attach a description of the moving status of the moving component at the moment.

S207, determining the control command according to a preset control algorithm and the pose, so as to enable the object to be controlled to determine the processing strategy for the perceived target according to the control command.

In this step, as shown in FIG. 3b, the corresponding perceived target is the vehicle 31 in the rectangular frame in the figure; the recurrent sub-network judges the right door 311 of the vehicle 31 is open. According to the preset processing strategy, when the door is open, someone may get off suddenly, therefore the automatic driving vehicle shall apply the processing strategy of decelerating or avoiding. The corresponding preset control algorithm sends a control command of decelerating or avoiding the intelligence driving vehicle. Thereafter, the intelligence driving vehicle performs operations for decelerating or avoiding the perceived target according to the control command.

It should be also noted that the perception network described in this embodiment can be a neural network for executing a single task of visual perception, or a combination of neural networks for executing multiple tasks.

Specifically, the perception network in the embodiment includes: a main backbone network, an auxiliary backbone network and a multitask sub-network;

The main backbone network and the auxiliary backbone network are configured to extract the features of the image to be perceived;

The multitask sub-network is configured to implement various kinds of tasks, including but not limited to:
  recognizing the perceived target;
  performing instance segmentation for the perceived target in the image to be perceived, for example, as shown in FIG. 3d, the outer contour range of the perceived vehicle is segmented and displayed;
  determining and labeling the status vector of the perceived target;
  dividing the moving component of the perceived target, as shown in FIG. 3f, the outer contour of the trunk cover is segmented and displayed; and
  labeling the perceived target with a category bounding box; for example, the boxes in FIG. 3b, FIG. 3d and FIG. 3f are the category bounding boxes.

The present embodiment provides a visual perception method to recognize the acquired image to be perceived with the perception network to determine the perceived target and the pose of the perceived target, and finally determine the control command according to the preset control algorithm and the pose, so as to enable the object to be controlled to determine the processing strategy for the perceived target according to the control command, thus realizing the pose perception of the moving component of the perceived target, and further achieving the technical effect of refining the perception granularity and deepening the analysis and understanding of the local motion of the object.

The following describes how to use the perception network training method of the present disclosure to train the perception network in a targeted manner, so as to enable the perception granularity of the perception network to reach the level of the moving component, and thus the perceived targets can be accurately analyzed while guaranteeing that the perception process is neither too complicated or time-consuming.

Figure 4:
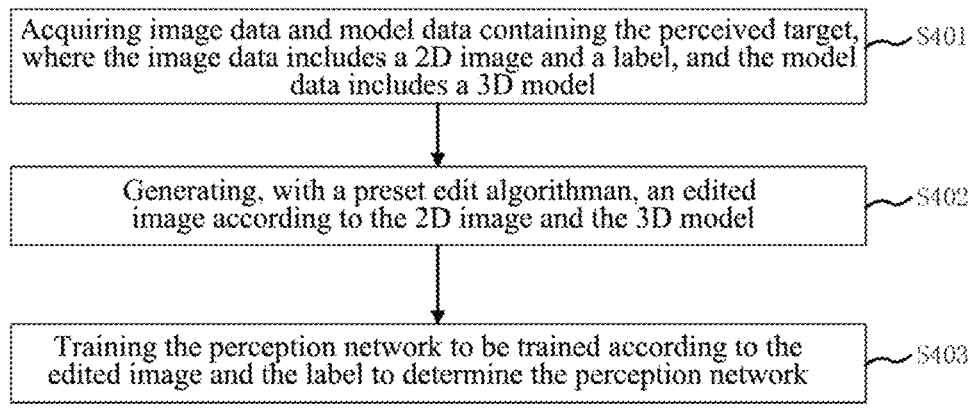
FIG. 4 is a schematic flow chart of a perception network training method according to the present disclosure.
Figure 5A:
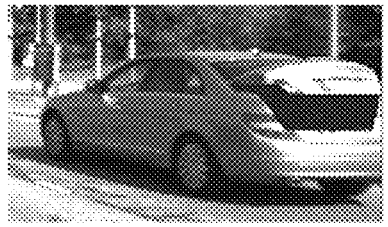
FIGS. 5*a*-5*h* are sample diagrams of the edited images according to embodiments of the present disclosure.
Figure 5B:
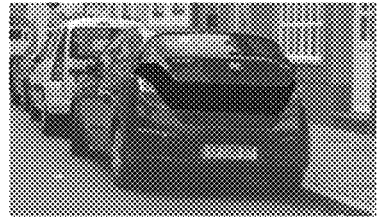
Figure 5C:
Figure 5D:
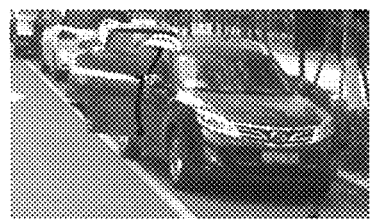
Figure 5E:
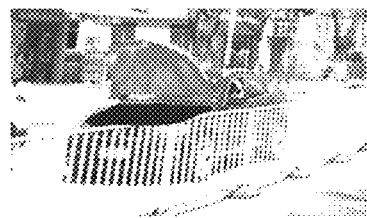
Figure 5F:
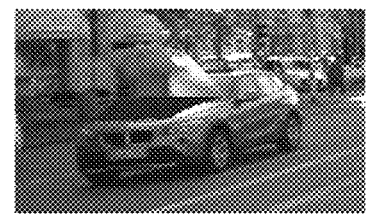
Figure 5G:
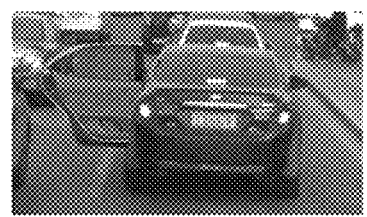
Figure 5H:
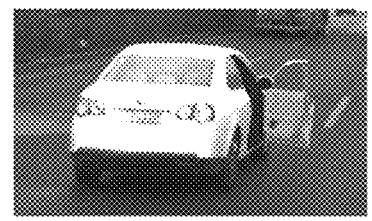

FIG. 4 is a schematic flow chart of a perception network training method according to the present disclosure. As shown in FIG. 4, the specific steps of the method, include:

S401, acquiring image data and model data containing a perceived target, where the image data includes a 2D image and a label, and the model data includes a 3D model.

In this step, the typical perceived target, such as a vehicle, a person, an animal and etc., in the object detection algorithm of a neural network is selected, and the single or preset combined image of the different perceived targets is selected respectively, for example, the image with only one vehicle, the image with multiple vehicles and the image mixed with person and vehicle. The images are then labeled manually, and the label content includes: the type of the perceived target, the corresponding moving components of the perceived target, and the status of the perceived target, etc. The images and the labels form the image data. Thereafter, the model data corresponding to the perceived target is created, and the model data includes a 3D model figure, and also includes the rendering graph of the environment and the rendering graph of the perceived target, etc. This embodiment does not mean to limit the model data, where the model data is to show the invisible parts from the view angle of 2D image, for example, the image of a driving vehicle. The 2D image only shows the exterior surface of the closed door, but the shape inside the vehicle is invisible. The invisible part shall be supplemented depending on the model data. In this step, the image data and the model data that meet the above requirements are acquired.

S402, generating, with the preset edit algorithm, an edited image according to the 2D image and the 3D model.

In this step, first, the moving component of the perceived target is intercepted from the 2D image, and the position of the moving component in the new status is determined according to the moving track of the moving component. For example: as for the human hand as a moving component, only the down lift status of the hand is shown in the 2D image, the preset editing algorithm can intercept the part of the hand in the 2D image, and then rotate the human hand around the shoulder in 90 degrees to reach the horizontal lift status of the human hand. Since there are no horizontal lifting hands in the 2D image, the image shall inevitably be partially missing and the performance is not realistic enough. To solve this problem, in this step, a 3D model is introduced, and the preset editing algorithm uses the 3D model to supplement the missing part of the image, so as to form an image of the horizontal lifting status of the human hand, that is, the edited image.

It should be noted that in the prior art, the training images are obtained by reacquiring images in different status, which greatly increases the resources and time spent on preparing for the training data. In addition, the prior art does not have realization value for obtaining sufficient amount of images. Another approach in the prior art is to generate a large number of status pictures entirely through CG (Computer Graphics) technology. The pictures generated through the CG technology usually have huge domain differences compared with the real scene, and thus it would be difficult to obtain a high-performance deep network model through training. Comparing with the above two prior arts, according to the method for generating an edited image provided in an embodiment of this present disclosure, pictures corresponding to different poses can be obtained by combining the motion of 3D model with the 2D image of the real scene, and introducing rendering effects for the environment and rendering effects for the perceived target. Therefore, it can be ensured that the training images are close enough to the real scene, and the problem that sufficient status pictures cannot be collected manually can be solved.

FIGS. 5a-5h are sample diagrams of the edited images according to embodiments of the present disclosure. As shown in FIGS. 5a-5h, the original 2D images of all vehicles are in a normal status, i.e., the doors, bonnet, and trunk are all closed. The preset editing algorithm generates the edited images of the status when the doors, bonnet and trunk are open. Because only a part of the 3D model is needed, it does not require a lot of calculations similar to CG images, thereby improving the generation speed of the edited images.

S403, training the perception network to be trained according to the edited image and the label to determine the perception network.

In this step, using the edited image generated in the previous step and using the neural network training method to train the perception network to be trained, a perception network with the perception granularity of the moving component level of the perceived target can be acquired. The training method includes but is not limited to: the gradient descent method, the Newton algorithm, the conjugate gradient method, the quasi-Newton method and the levenberg-marquardt algorithm.

The embodiment of the present disclosure provides a perception network training method. By acquiring image data and model data of a perceived target, using a preset editing algorithm on the basis of 2D images, simulating the pose of the moving components of various perceived targets with the model data, combining and editing to generate an edited image, and finally training the perception network to be trained with the edited image, a perception network with the granularity of the moving component level of the perceived target can be obtained. The technical effect of generating training images more quickly, more realistically and with smaller domain differences is achieved.

Figure 6:
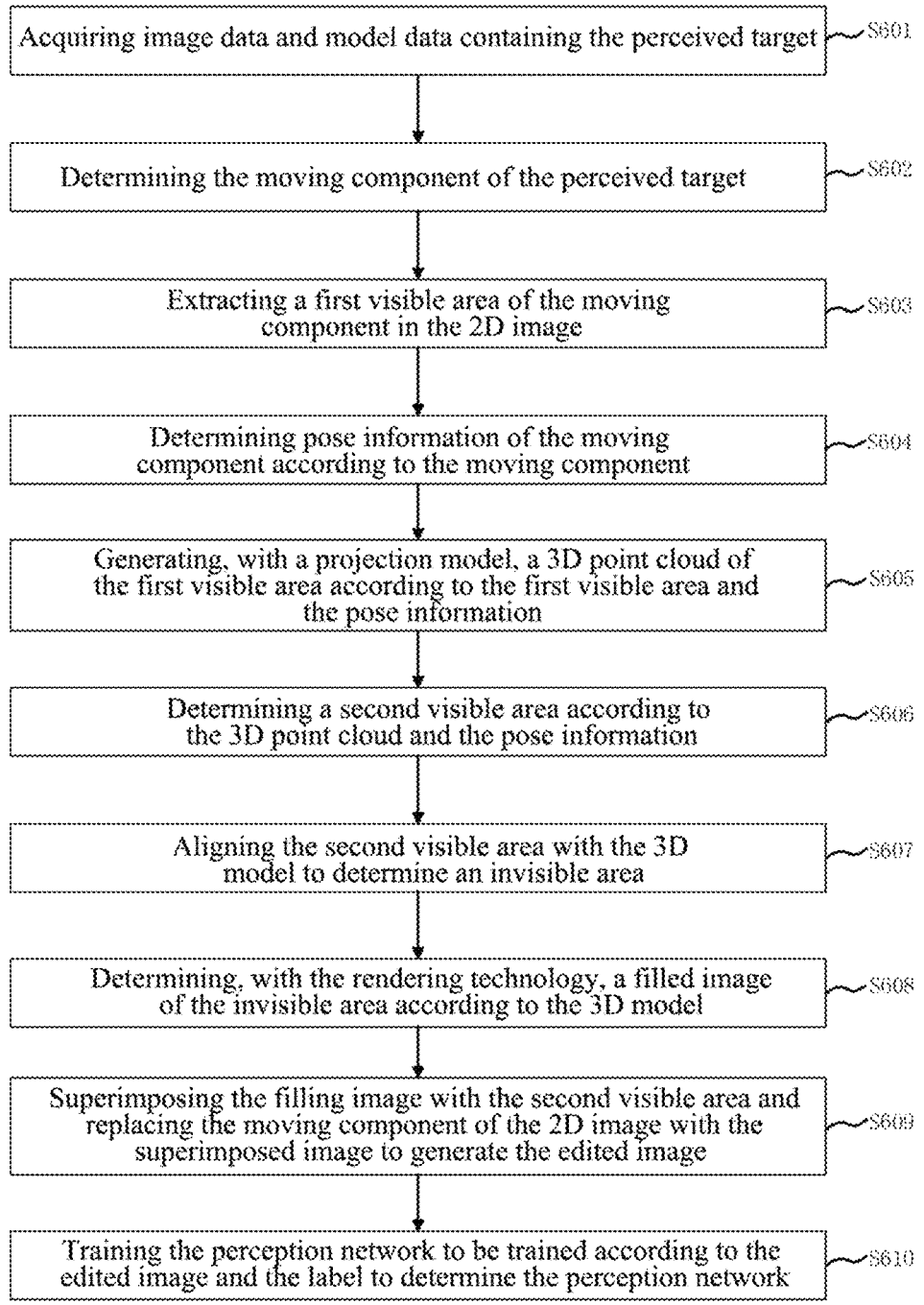
FIG. 6 is a schematic flow chart of another perception network training method according to an embodiment of the present disclosure.

FIG. 6 is a schematic flow chart of another perception network training method according to an embodiment of the present disclosure. The embodiment is used to illustrate the specific implementation of the perception network training method of the present disclosure with the specific application scenario of generating the open status of the front-right door or the open status of the trunk cover of the vehicle. As shown in FIG. 6, the specific steps of the method, include:

S601, acquiring image data and model data containing the perceived target.

Figure 7:
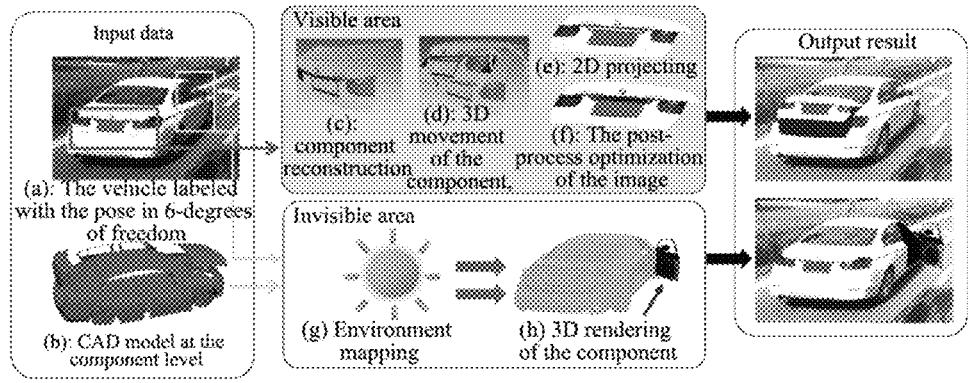
FIG. 7 is a schematic diagram of the generating process of the edited images according to an embodiment of the present disclosure.

FIG. 7 is a schematic diagram of the generating process of the edited image according to an embodiment of the present disclosure. As shown in FIG. 7, the 2D images containing the perceived target are firstly acquired, where in the embodiment, the perceived target is a vehicle and then the 2D image of the vehicle is labeled with the contents, including: the category of the perceived target (i.e., the vehicle), the corresponding moving component of the perceived target (i.e., the front-right door or trunk cover), the status of the front-right door and trunk (i.e., open), the coordinates of the rotating axle of the right door, the pose of the 6-degrees of freedom of the vehicle and the like; thereafter, the 3D model of the vehicle is acquired as the model data.

S602, determining the corresponding moving component of the perceived target.

In this step, the moving component of the vehicle may be at least one of the front-left door, rear-left door, front-right door, rear-right door, trunk and bonnet, which refers to the front-right door in the embodiment. As the pose and motion track of different moving components are different, the moving component shall be determined.

S603, extracting a first visible area of the moving component in the 2D image.

After determining the front-right door as the moving component, the captured image representing the front-right door is extracted from the 2D image as the first visible area.

S604, determining pose information of the moving component according to the moving component.

Determining the front-right door as the moving component, the pose information of the 6-degrees of freedom corresponding to the front-right door includes: the rotating direction, the final position, the required rotating angle, etc., in a completely open status.

S605, generating, with a projection model, a 3D point cloud of the first visible area according to the first visible area and the pose information.

In this step, the pose information of the moving component and the 6-degrees of freedom of the object are projected via the pinhole camera. That is to say, the projection model can reconstruct the component area in the 2D image as the 3D point cloud P with Formula (1), the Formula (1) is:

$$P = R_g^{-1}(D(u)K^{-1}\dot{u} - t_g) \qquad (1)$$

where D is the depth map, $R_g$ and $t_g$ mean the pose information of the moving component, i.e., the global pose, K is the camera intrinsic parameter and $\dot{u}$ is the homogeneous vector of the coordinates of the image pixel.

S606, determining a second visible area according to the 3D point cloud and the pose information.

Assuming the rotating matrix of the object relative to the rotating axle is $R_o$, Formula (2) is used to calculate the newly-projected image pixel u', and the Formula (2) is:

$$u' = \lfloor \pi(K(R_g(R_o(P-t_o)+t_o)+t_g)) \rfloor \qquad (2)$$

where $R_g$ and $t_g$ mean the pose information of the moving component, i.e., the global pose, and K is the camera intrinsic parameter.

u' means the second visible area. The process comprises the component reconstruction shown in (c), the 3D motion of the component in (d), and the 2D projection in (e) in FIG. 7.

Alternatively, after determining the second visible area, there will be generally some cavities in the second visible area, and the pixel distribution is not uniform. In this case, the linear nearest neighbor interpolation can be used to complete the cavities, and then the bilateral filtering algorithm can be used to perform smoothing processing on the second visible area, as shown in (f) image post-processing optimization in FIG. 7. In this embodiment, the linear nearest neighbor interpolation and bilateral filtering algorithm are smoothing algorithms. It can be understood that this disclosure does not specifically limit the smoothing algorithms, and furthermore, the algorithms that can achieve the cavity completion and smoothing are all within the scope described in the present disclosure. Thus, those skilled in the art can select an appropriate implementation according to the specific condition.

S607, aligning the second visible area with the 3D model, to determine an invisible area.

The 3D model area of the moving component is moved in the motion mode in the pose information, and aligned with the second visible area, thus the invisible area can be obtained.

S608, determining, with the rendering technology, a filled image of the invisible area according to the 3D model.

According to the contour range and shape of the invisible area, the filled image of the invisible area can be acquired by using the environment rendering in the 3D model data and the rendering image of the perceived target. The environment mapping as shown in (g) of FIG. 7 to the 3D component rendering shown in (h) of FIG. 7, are the procedures of generating the filled image.

S609, superimposing the filling image with the second visible area, and replacing the moving component in the 2D image with the superimposed image to generate the edited image.

In the two edited images, which are the output results in FIG. 7, the filled image is superimposed on the second visible area, and the superimposed image is used to replace the moving component in the 2D image, i.e., the trunk cover or the front-right door, thus the edited image available for training with the label of the pose of the moving component is finally obtained.

S610, training the perception network to be trained according to the edited image and the label, to determine the perception network.

A specific description of this step refers to S403 in the embodiment shown in FIG. 4, which won't be repeated herein.

In the perception network training method according to this embodiment, on the basis of the image editing technology guided by the 3D moving component, the component-level CAD 3D model aligned with the object in the 2D image is used to guide the 2D component area to perform reasonable motions and changes, so as to enable the 2D object in the image to show different status, and enable the automatic generation of the corresponding label information. Compared with the method of collecting the status image and label of the object manually, this technology automatically generates a large number of images based on the existing data, where the images cover all the status of the object, and the corresponding label information can be generated automatically. On the other hand, compared with the method of rendering by CG technology, the image generated by the method recorded in this embodiment is more real, which greatly reduces the problem of domain difference, and obtains faster generation speed.

Figure 8:
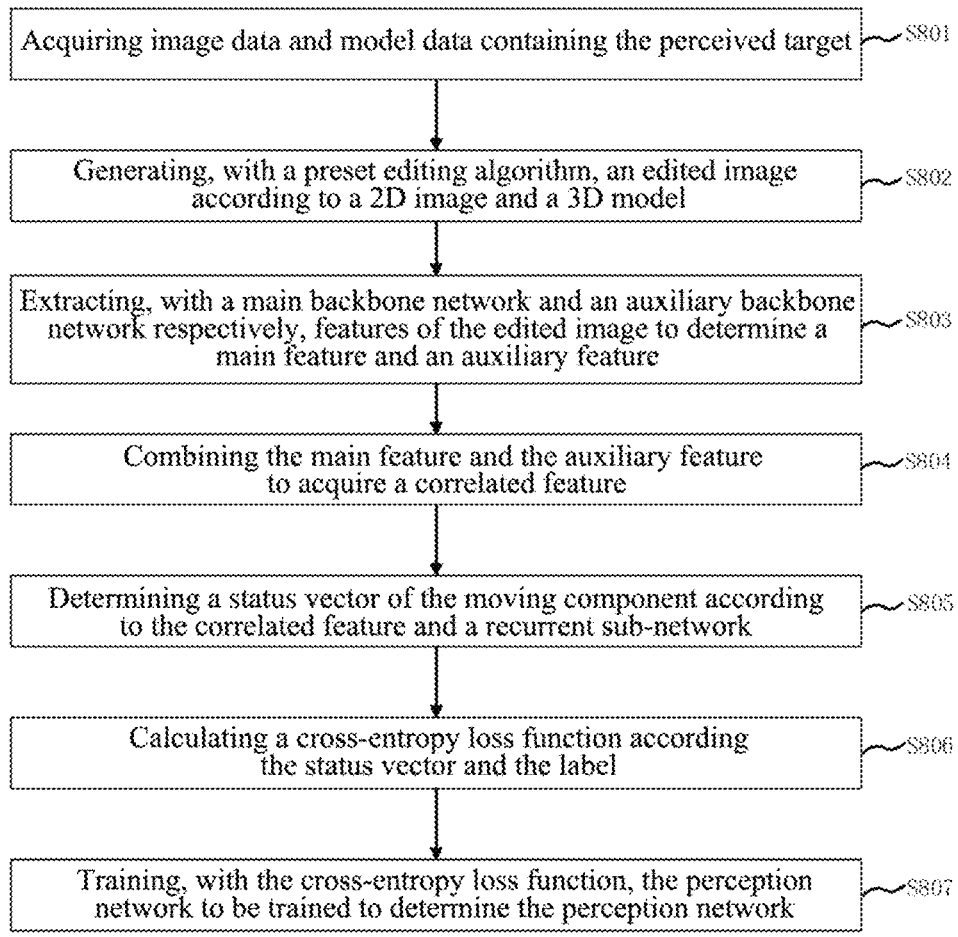
FIG. 8 is a schematic flow chart of yet another perception network training method according to an embodiment of the present disclosure.

FIG. 8 is a schematic flow chart of another perception network training method according to an embodiment of the present disclosure. As shown in FIG. 8, the specific steps of the method include:

S801, acquiring image data and model data containing the perceived target.

S802, generating, with a preset editing algorithm, an edited image according to a 2D image and a 3D model.

Specific descriptions of S801-S802 in this embodiment refer to S601-S609 in the embodiment shown in FIG. 6, which won't be repeated herein.

S803, performing feature extraction on the edited image with a main backbone network and an auxiliary backbone network respectively to determine a main feature and an auxiliary feature.

In this step, the main backbone network is used to perform feature extraction with the edited image, and meanwhile, the auxiliary backbone network is also used to perform feature extraction with the edited image. It can be understood that this embodiment does not limit the sequence of extracting features by the two backbone networks.

It should be also noted that the main backbone network and the auxiliary backbone network may be two identical neural network algorithms, or may be two different neural network algorithms.

The feature of the edited image extracted by the main backbone network is the main feature; the feature of the edited image extracted by the auxiliary backbone network is the auxiliary feature. The specific implementation of extracting features is convoluting for each convolution layer, which won't be repeated herein.

S804, combining the main feature and the auxiliary feature to acquire a correlated feature.

Figure 9:
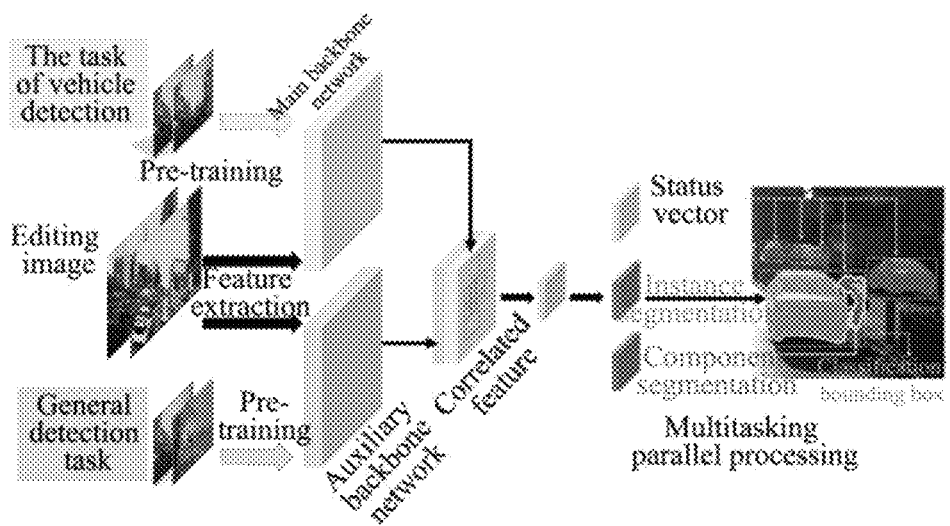
FIG. 9 is a structure diagram of a data flow of perception network training according to an embodiment of the present disclosure.

FIG. 9 is a structure chart of the data flow of perception network training according to an embodiment of the present disclosure. As shown in FIG. 9, the main feature and the auxiliary feature are combined together to form the correlated feature. Specifically, the main feature matrix is combined with the auxiliary feature matrix to form the correlated feature matrix.

Alternatively, before the step of S804, the method further includes:

pre-training, with a real image to be perceived containing the specific perceived target or scenario, the main backbone network, so as to acquire a first weight corresponding to the main backbone network, where the first weight is a neural network parameter of the main backbone network.

As for the auxiliary backbone network, a general detection task needs to be used for pre-training. The general detection task refers to a set of preset training methods that are used for most neural networks. By pre-training the auxiliary backbone network, a second weight can be obtained, and is a neural network parameter of the auxiliary backbone network.

The combination of the first weight with the second weight shall enhance the generalization performance of the perception network, thus being able to perceive various types of perceived targets.

It should be noted that the first weight and the second weight shall be frozen after the pre-training, i.e., the values of the first weight and the second weight won't change in the following training process.

S805, determining status vector of the moving component according to the correlated feature and the recurrent sub-network.

The correlated feature is inputted into the recurrent sub-network, which generates the status vector of the moving component of the perceived target. The status vector is the corresponding value of the status of the moving component (for example, 0 represents closed, and 1 represents open), and thus for the front-right door and trunk cover of the vehicle, the combined status vector [0, 1] represents that the front-right door is closed and the trunk cover is open.

S806, calculating a cross-entropy loss function according to the status vector and the label.

The difference between the status vector and the label status (i.e., the cross-entropy loss function) is determined by comparing the status vector acquired in the previous step with the state of a manual label and using the cross-entropy loss function algorithm.

S807, training, with the cross-entropy loss function, the perception network to be trained to determine the perception network.

The perception network is determined by performing counter-propagation with the cross-entropy loss function and completing the training for the perception network after multiple iterations.

It should also be noted that, as shown in FIG. 9, the perception network described in the present disclosure is a multitask neural network that can perform detection, instance segmentation, status description, and segmentation of the moving components for the perceived target simultaneously. The detection on the perceived target refers to the ability to recognize the perceived target and enclose the perceived target with a box, i.e., a category bounding box. The instance segmentation refers to the ability to select the detected perceived target in the image to be perceived with a curved frame. The segmentation of the moving components refers to the ability to select moving components in the image to be perceived with curved frames. The status description refers to the ability to display the status of the moving components or perceived target with preset text. As shown in FIG. 3b, FIG. 3d and FIG. 3f, after the perception network perceives the perceived target, the corresponding multitask result is labeled on the picture to be perceived.

The perception network training method according to this embodiment introduces a two-way backbone network mode after generating the edited image. The main backbone network improves the accuracy of the perception network for the specific perceived target, and the auxiliary backbone network can improve the generalization performance of the perception network, i.e., more types of perceived targets can maintain relatively high perception accuracy. Finally, the recurrent sub-model is used to further refine the perception granularity of the perceived target, and accurately recognize the pose of the moving components of the perceived target, thereby deepening the perception network's ability to analyze and understand the perceived target.

A person of ordinary skill in the art can understand that all or part of the steps in the foregoing method embodiments can be implemented by a related hardware with program instructions. The foregoing program can be stored in a computer-readable storage medium. When the program is executed, the steps including the foregoing method embodiments are executed; and the foregoing storage medium includes: ROM, RAM, magnetic disk, or optical disk and other media that can store program codes.

Figure 10:
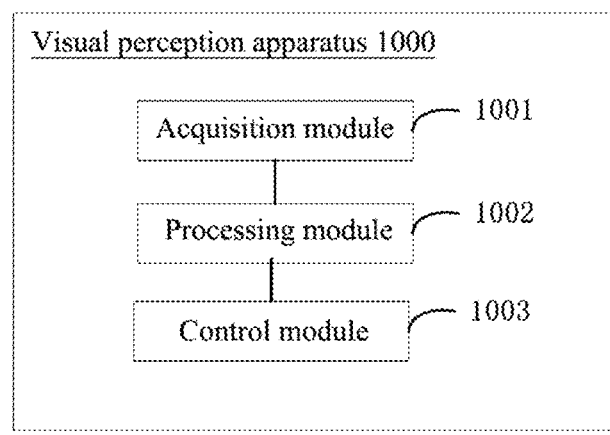
FIG. 10 is a schematic structure diagram of a visual perception apparatus according to the present disclosure.

FIG. 10 is a structure diagram of a visual perception apparatus according to an embodiment of the present disclosure. The visual perception apparatus can be implemented by software, hardware, or a combination of both.

As shown in FIG. 10, the visual perception apparatus 1000 according to the embodiment includes:
  an acquisition module 1001, configured to acquire an image to be perceived, where the image to be perceived contains at least one target object;
  a processing module 1002, configured to recognize the image to be perceived with a perception network, to determine the perceived target and the pose of the perceived target, where the perceived target is a target object of which the pose conforms to a preset attribute;
  a control module 1003, configured to determine a control command according to a preset control algorithm and the pose, so as to enable an object to be controlled to determine a processing strategy for the perceived target according to the control command.

Alternatively, the processing module 1002 is configured to perform feature extraction on the image to be perceived to determine the features of the image to be perceived; classify the features with a classifier to determine the perceived target; and determine the pose of the perceived target with a recurrent sub-network.

In one possible design, the processing module 1002 is also configured to determine a moving component in a preset database that matches the perceived target; determine, with the recurrent sub-network, status probability of the moving component according to the moving component and a corresponding standard status of the moving component; and determine the pose of the perceived target according to the status probability, where the pose includes a status vector.

In one possible design, the control module 1003 is configured to determine the control command according to a preset automatic driving control algorithm and the pose, so as to enable the vehicle to be controlled to avoid the perceived target according to the control command.

Alternatively, the processing module 1002 is also configured to label the perceived target and the pose on the image to be perceived and display the labeled perceived image after recognizing the image to be perceived with a perception network to determine the perceived target and the pose of the perceived target.

It should be noted that the visual perception apparatus according to the embodiment shown in FIG. 10 can be used to execute the visual perception methods provided in any one of the foregoing embodiments, whose specific implementation principles, technical features, term explanations, and technical effects are similar, which won't be repeated herein.

Figure 11:
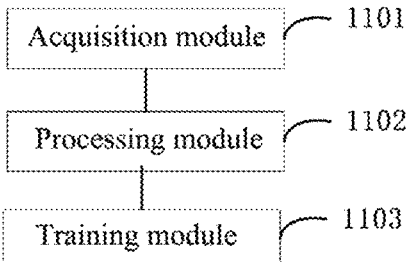
FIG. 11 is a schematic structure diagram of a perception network training apparatus according to the present disclosure.

FIG. 11 is a structure diagram of a perception network training apparatus according to an embodiment of the present disclosure. The perception network training apparatus can be implemented by software, hardware, or a combination of both.

As shown in FIG. 11, the perception network training apparatus 1100 according to the embodiment includes:
  an acquisition module 1101, configured to acquire image data and model data containing the perceived target, where the image data includes a 2D image and a label, and the model data includes a 3D model;
  an image editing module 1102, configured to generate, with a preset editing algorithm, an edited image according to the 2D image and the 3D model; and
  a training module 1103, configured to train the perception network to be trained according to the edited image and the label to determine the perception network.

In one possible design, the image editing module 1102 is configured to determine a corresponding moving component of the perceived target; extract a first visible area of the moving component in the 2D image; and generate the edited image according to the first visible area and the 3D model.

In one possible design, the image editing module 1102 is also configured to determine pose information of the moving component according to the moving component, where the pose information is a matrix formed by a motion state in the 6-degrees of freedom; generate, with a projection model, a 3D point cloud of the first visible area according to the first visible area and the pose information; determine a second visible area according to the 3D point cloud and the pose information, where the second visible area is a visible area of the moving component at a post-movement position; and generate, with a filling algorithm, the edited image according to the second visible area and the 3D model.

In one possible design, the image editing module 1102 is also configured to align the second visible area with the 3D model to determine an invisible area; determine, with the rendering technology, a filling image of the invisible area according to the 3D model; and superimpose the filling image with the second visible area, and replace the moving component in the image with the superimposed image to generate the edited image.

Alternatively, the image editing module 1102 is further configured to perform, with a smoothing processing algorithm, smoothing processing on the second visible area after determining the second visible area.

Alternatively, the training module 1103 is configured to extract, with a main backbone network and an auxiliary backbone network respectively, features of the edited image to determine a main feature and an auxiliary feature; input the main feature and the auxiliary feature into the main backbone network and the auxiliary backbone network to acquire a correlated feature, where the main backbone network is configured with a first weight, and the auxiliary backbone network is configured with a second weight; determine a status vector of the moving component according to the correlated feature and a recurrent sub-network; and train the perception network to be trained according to the status vector and the label to determine the perception network.

In one possible design, the training module 1103 is also configured to calculate a cross-entropy loss function according to the status vector and the label; and train, with the cross-entropy loss function, the perception network to be trained to determine the perception network.

Alternatively, the main backbone network is configured with a first weight, and the auxiliary backbone network is configured with a second weight, and the training module 1103 is also configured to pre-train the main backbone network and the auxiliary backbone network to determine the first weight and the second weight, before inputting the main feature and the auxiliary feature into the main backbone network and the auxiliary backbone network to acquire the correlated feature.

Alternatively, the acquisition module 1101 is also configured to acquire an actual testing image and a general detecting image; and the training module 1103 is also configured to conduct perception training on the main backbone network with the actual testing image; and conduct the perception training on the auxiliary backbone network with the general detecting image.

It should be noted that the perception network training apparatus according to the embodiment shown in FIG. 11 can be used to execute the perception network training method provided in any one of the foregoing embodiments, whose specific implementation principles, technical features, term explanations and technical effects are similar, which won't be repeated herein.

Figure 12:
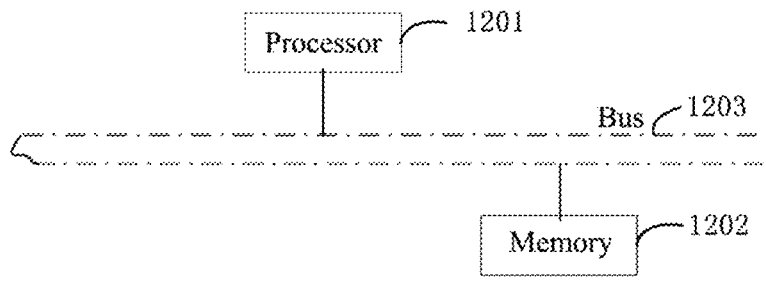
FIG. 12 is a schematic structure diagram of an electronic device for visual perception according to the present disclosure.

FIG. 12 is a schematic structure diagram of an electronic device for visual perception according to the present disclosure. As shown in FIG. 12, the electronic device for visual perception 1200 may include: at least one processor 1201 and a memory 1202. FIG. 12 shows an electronic device with a processor as an example.

The memory 1202 is configured to store a program. Specifically, the program may include program codes, which include operating instructions of a computer.

The memory 1202 may contain a high-speed RAM memory, and may further contain non-volatile memory, for example at least one disk memory.

The processor 1201 is configured to execute the computer execution instructions stored in the memory 1202, so as to realize the visual perception methods provided in the foregoing embodiments.

As such, the processor 1201 may be a central processing unit (CPU for short), or an application-specific integrated circuit (ASIC for short), or being configured as one or more integrated circuit to implement the embodiments of the present disclosure.

Alternatively, the memory 1202 may be independent from or integrated with the processor 1201. When the memory 1202 is a device independent from the processor 1201, the electronic device for visual perception 1200, may also include:

a bus 1203, configured to connect the processor 1201 and the memory 1202. The bus may be an industry-standard architecture (ISA for short) bus, a peripheral component interconnection (PCI) bus or an extended industry standard architecture (EISA) bus and the like. The bus may be divided into an address bus, a data bus, a control bus, and the like, but it does not mean that only one bus or one type of bus is available.

Alternatively, in a specific implementation, if the memory 1202 and the processor 1201 are integrated into a single ship, the memory 1202 and the processor 1201 can communicate through an internal interface.

Figure 13:
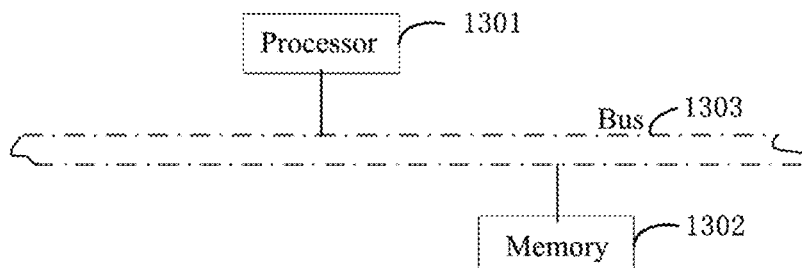
FIG. 13 is a schematic structure diagram of an electronic device for perception network training according to the present disclosure.

FIG. 13 is a schematic structure diagram of an electronic device for perception network training according to the present disclosure. As shown in FIG. 13, the electronic device for perception network training 1300 may include: at least one processor 1301 and a memory 1302. FIG. 13 shows an electronic device with a processor as an example.

The memory 1302 is configured to store a program. Specifically, the program may comprise program codes, which include operating instructions of a computer.

The memory 1302 may include a high-speed RAM memory, or may further include a non-volatile memory, for example at least one disk memory.

The processor 1301 is configured to execute the computer execution instructions stored in the memory 1302, so as to realize the perception network training methods provided in the foregoing embodiments.

As such, the processor 1301 may be a central processing unit (CPU for short), or an application-specific integrated circuit (ASIC for short), or may be configured as one or more integrated circuit to implement the embodiments of the present disclosure.

Alternatively, the memory 1302 may be independent from or integrated with the processor 1301. When the memory 1302 is a device independent from the processor 1301, the electronic device for visual perception 1300 may also include:

a bus 1303, configured to connect the processor 1301 and the memory 1302. The bus may be an industry-standard architecture (ISA for short) bus, a peripheral component interconnect (PCI) bus or an extended industry standard architecture (EISA) bus and the like. The bus may be divided into an address bus, a data bus, a control bus, and the like, but it does not mean that only one bus or one type of bus is available.

Alternatively, in a specific implementation, if the memory 1302 and the processor 1301 are integrated into a single ship, the memory 1302 and the processor 1301 can communicate through an internal interface.

The present disclosure also provides a computer-readable storage medium, where the computer-readable storage medium may include: U disk, mobile hard disk, read-only memory (ROM), random access memory (RAM), magnetic disk or optical disk, or other media that can store program codes. Specifically, the computer-readable storage medium stores program instructions, where the instructions are configured to implement the visual perception methods in the foregoing embodiments.

The present disclosure also provides a computer-readable storage medium, where the computer-readable storage medium may include: U disk, mobile hard disk, read-only memory (ROM), random access memory (RAM), magnetic disk or optical disk, or other media that can store program codes. Specifically, the computer-readable storage medium stores program instructions, where the instructions are configured to implement the perception network training methods in the foregoing embodiments.

Finally, it should be noted that the above embodiments are only used to illustrate the technical solutions of the present disclosure, not to limit thereof; although the present disclosure has been described in detail with reference to the foregoing embodiments, those of ordinary skill in the art should understand: it is still possible to modify the technical solutions described in the foregoing embodiments, or equivalently replace some or all of the technical features; and these modifications or replacements do not cause the essence of the corresponding technical solutions deviate from the scope of the technical solutions of the embodiments of the present disclosure.

What is claimed is:

1. A visual perception method, comprising:
    acquiring an image to be perceived, wherein the image to be perceived comprises at least one target object;
    recognizing the image to be perceived with a perception network to determine a perceived target and a pose of the perceived target, wherein the perceived target is a target object, of which the pose conforms to a preset attribute; and
    determining a control command according to a preset control algorithm and the pose, so as to enable an object to be controlled to determine a processing strategy for the perceived target according to the control command.

2. The visual perception method according to claim 1, wherein the recognizing the image to be perceived with a perception network to determine a perceived target and a pose of the perceived target, comprises:
    performing feature extraction on the image to be perceived to determine features of the image to be perceived;
    classifying the features with a classifier to determine the perceived target; and
    determining the pose of the perceived target with a recurrent sub-network.

3. The visual perception method according to claim 2, wherein the determining the pose of the perceived target with a recurrent sub-network, comprises:
    determining a moving component in a preset database that matches the perceived target;
    determining, with the recurrent sub-network, status probability of the moving component according to the moving component and a standard status of the moving component; and
    determining the pose of the perceived target according to the status probability, wherein the pose comprises a status vector.

4. The visual perception method according to claim 1, wherein the perceived target comprises a vehicle.

5. The visual perception method according to claim 4, wherein the determining a control command according to a preset control algorithm and the pose, comprises:
    determining the control command according to a preset automatic driving control algorithm and the pose, so as to enable the vehicle to be controlled to decelerate or avoid the perceived target according to the control command.

6. The visual perception method according to claim 1, wherein after the recognizing the image to be perceived with a perception network to determine a perceived target and a pose of the perceived target, further comprises:
    labeling the perceived target and the pose on the image to be perceived, and displaying the labeled perceived image.

7. The visual perception method according to claim 4, wherein the moving component comprises at least one of a front-left door, a rear-left door, a front-right door, a rear-right door, a trunk cover and a bonnet.

8. The visual perception method according to claim 1, wherein the perception network comprises: a main backbone network, an auxiliary backbone network and a multitask sub-network;
    the main backbone network and the auxiliary backbone network are configured to extract the features of the image to be perceived;
    the multitask sub-network is configured to recognize the perceived target, conduct instance segmentation on the perceived target in the image to be perceived, determine and label a status vector of the perceived target, conduct segmentation on the moving component of the perceived target, and label the perceived target with a classification box.

9. A perception network training method, comprising:
    acquiring image data and model data containing a perceived target, wherein the image data comprises a 2D image and a label, and the model data comprises a 3D model;
    generating, with a preset editing algorithm, an edited image according to the 2D image and the 3D model; and
    training the perception network to be trained according to the edited image and the label to determine the perception network.

10. The perception network training method according to claim 9, wherein the generating, with a preset editing algorithm, an edited image according to the 2D image and the 3D model, comprises:
    determining a corresponding moving component of the perceived target;
    extracting a first visible area of the moving component in the 2D image; and
    generating the edited image according to the first visible area and the 3D model.

11. The perception network training method according to claim 10, wherein the generating the edited image according to the first visible area and the 3D model, comprises:
    determining pose information of the moving component according to the moving component, wherein the pose information is a matrix formed by a motion state of the moving component in 6-degrees of freedom;
    generating, with a projection model, a 3D point cloud of the first visible area according to the first visible area and the pose information;
    determining a second visible area according to the 3D point cloud and the pose information, wherein the second visible area is a visible area of the moving component at a post-movement position; and
    generating, with a filling algorithm, the edited image according to the second visible area and the 3D model.

12. The perception network training method according to claim 11, wherein the generating, with a filling algorithm, the edited image according to the second visible area and the 3D model, comprises:
- aligning the second visible area with the 3D model to determine an invisible area;
- determining, with the rendering technology, a filling image of the invisible area according to the 3D model; and
- superimposing the filling image with the second visible area and replacing the moving component of the 2D image with the superimposed image to generate the edited image.

13. The perception network training method according to claim 11, wherein after the determining a second visible area, further comprises:
- performing, with a smoothing algorithm, smoothing processing on the second visible area.

14. The perception network training method according to claim 9, wherein the training the perception network to be trained according to the edited image and the label to determine the perception network, comprises:
- extracting, with a main backbone network and an auxiliary backbone network respectively, features of the edited image to determine a main feature and an auxiliary feature;
- combining the main feature and the auxiliary feature to acquire a correlated feature;
- determining a status vector of the moving component according to the correlated feature and a recurrent sub-network; and
- training the perception network to be trained according to the status vector and the label to determine the perception network.

15. The perception network training method according to claim 14, wherein the training the perception network to be trained according to the status vector and the label to determine the perception network, comprises:
- calculating a cross-entropy loss function according to the status vector and the label;
- training, with the cross-entropy loss function, the perception network to be trained to determine the perception network.

16. The perception network training method according to claim 14, wherein the main backbone network is configured with a first weight, and the auxiliary backbone network is configured with a second weight, and before the combining the main feature and the auxiliary feature to acquire a correlated feature, further comprises:
- pre-training the main backbone network and the auxiliary backbone network to determine the first weight and the second weight.

17. The perception network training method according to claim 16, wherein the pre-training comprises:
- acquiring an actual testing image and a general detecting image;
- conducting perception training on the main backbone network with the actual testing image; and
- conducting perception training on the auxiliary backbone network with the general detecting image.

18. The perception network training method according to claim 14, wherein the main backbone network and the auxiliary backbone network are the same target detection network.

19. An electronic device for visual perception, comprising:
- a processor; and,
- a memory, configured to store processor executable instructions;
- wherein the processor is configured to implement the visual perception method according to claim 1 through executing the instructions.

20. An electronic device, comprising:
- a processor; and,
- a memory, configured to store processor executable instructions;
- wherein the processor is configured to implement the visual perception method according to claim 9 through executing the instructions.

* * * * *